Oct. 6, 1970           R. E. ARICK           3,532,002

RECIPROCATING DRIVE ARRANGEMENT FOR A PRESS OR THE LIKE

Filed April 3, 1968           6 Sheets-Sheet 1

Inventor
ROBERT E. ARICK
by JEFFERS & YOUNG
Attorneys

Inventor
ROBERT E. ARICK
by JEFFERS & YOUNG
Attorneys

Oct. 6, 1970     R. E. ARICK     3,532,002

RECIPROCATING DRIVE ARRANGEMENT FOR A PRESS OR THE LIKE

Filed April 3, 1968     6 Sheets-Sheet 4

Inventor
ROBERT E. ARICK
by JEFFERS & YOUNG
Attorneys

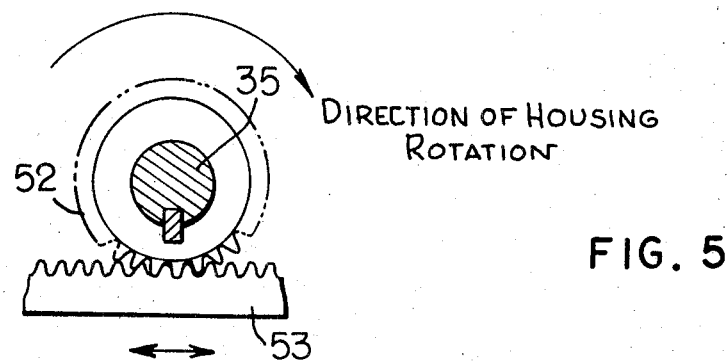
FIG. 5
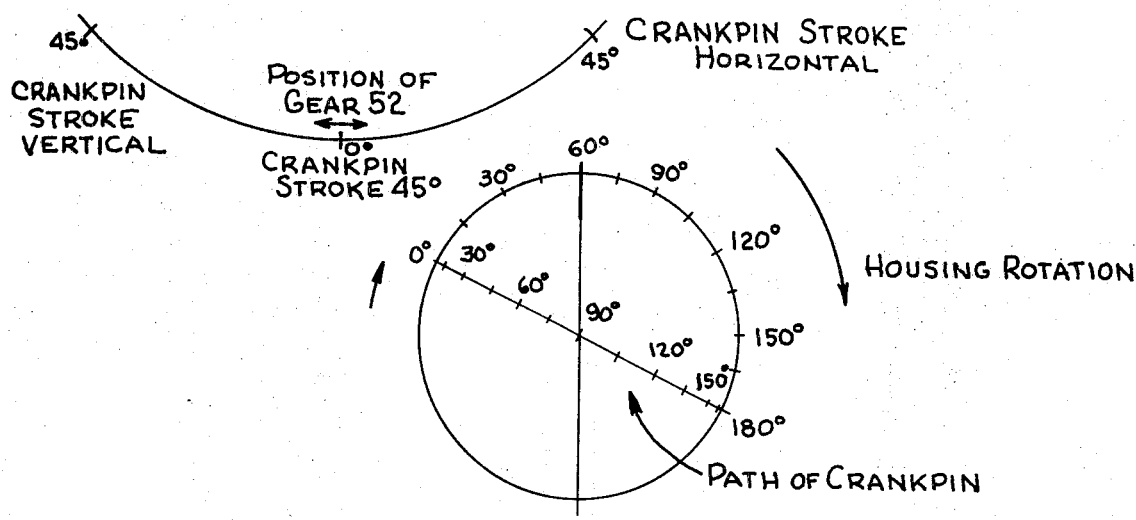
FIG. 7
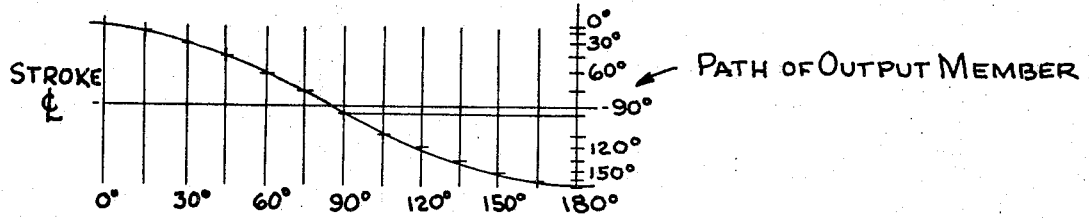

United States Patent Office 3,532,002
Patented Oct. 6, 1970

---

3,532,002
RECIPROCATING DRIVE ARRANGEMENT FOR A PRESS OR THE LIKE
Robert E. Arick, Fort Wayne, Ind., assignor to The Minster Machine Company, Minster, Ohio, a corporation of Ohio
Filed Apr. 3, 1968, Ser. No. 718,426
Int. Cl. F16h *21/06*
U.S. Cl. 74—50        15 Claims

ABSTRACT OF THE DISCLOSURE

The centers of three spur gears are rotated about the axis of a first spur gear which has a predetermined overall gear ratio with the output gear of the three spur gears. The center of the output gear is positioned a predetermined distance from the axis, and a crankpin is positioned on the output gear the same predetermined distance from the output gear center. The stroke of the crankpin follows a straight line and is four times the predetermined distance. The direction of the straight line may be changed by rotating the first gear about its axis.

BACKGROUND OF THE INVENTION

My invention relates to an improved drive for a press or the like, and particularly to such an improved drive that provides straight line reciprocating motion of a crankpin from rotary gear motion. More particularly, my invention relates to such a drive that has a straight line motion whose direction may be easily changed, that may have as small a stroke as desired, and that may be provided with gear and structure capable of producing large forces.

Reciprocating drives are used in many applications, such as feed mechanisms and power transmission mechanisms. Frequently, it is necessary or desirable that the length of the stroke be changed to meet the demand of a new or different situation. In order that the length of stroke could be changed, prior reciprocating drives either required that a drive be shut down so that relatively lengthy adjustments and changes could be made; or required that relatively complex mechanisms be provided on a drive so that the adjustments and changes could be made relatively quickly.

Accordingly, an object of my invention is to provide an improved reciprocating drive.

Another object of my invention is to provide an improved reciprocating drive having a stroke length that can be varied between nearly zero and some desired maximum by the use of gears only.

Another object of my invention is to provide an improved reciprocating drive having a stroke length that can be quickly changed without shutting the drive down.

Another object of my invention is to provide a relatively simple reciprocating drive having a stroke length that can be easily changed.

Reciprocating power transmission mechanisms such as punch presses are frequently needed to provide a relatively large force over a relatively short stroke or stroke distance. Because of such a relatively large force, it is desirable that the crankpin, which delivers the force to a connecting rod and a tool, move in a straight line. Generally, this straight line motion is provided from rotary motion, since a rotating flywheel may be usd to store a relatively large amount of energy and provide the desired force. Previously, straight line motion has been provided by the use of a circular internal gear having internal teeth. A spur gear having external teeth is meshed within the internal gear. If straight line motion is desired, the pitch diameter of the spur gear must be one half the pitch diameter of the internal gear, and the crankpin must be positioned on the pitch circle of the spur gear. As the spur gear rotates within the internal gear, the crankpin moves along a straight line and provides a stroke equal to the pitch diameter of the internal gear. If a relatively short stroke is desired, then the internal gear must have a pitch diameter that is also relatively short. The force which can be provided from this reciprocating, straight line motion of the crankpin is limited by the strength of the teeth of the internal gear and the spur gear. However, many current or present manufacturing techniques require considerably greater forces. Hence, in situations requiring a straight line stroke of a relatively large force, the gears must be relatively large in order to have teeth of the necessary strength. Expressed in another way, in situations requiring a relatively short, straight line stroke, the amount of force which can be provided has been limited by the strength of the gear teeth.

Accordingly, another object of my invention is to provide an improved press drive arrangement that converts rotary motion to straight line motion having a stroke that can be made as small as desired.

Another object of my invention is to provide an improved press drive arrangement that provides a straight line stroke having a force that can be made very large.

Another object of my invention is to provide an improved drive arrangement that provides straight line motion over a stroke which can be made as small as desired, and that has a force which can be made as large as desired.

Another object of my invention is to provide an improved drive arrangement which utilizes only spur gears that rotate and provide reciprocating straight line motion having a stroke that can be varied, and having a force capability that is limited only by the practical design characteristics of the spur gears, bearings, and other members.

Another object of my invention is to provide an improved drive arrangement which utilizes spur gears that rotate and provide reciprocating motion along a straight line whose direction can be changed, without a clutch or without disassembling the drive arrangement, in order to change the effective stroke length.

SUMMARY OF THE INVENTION

Briefly, these and other objects are achieved in accordance with one embodiment of my invention by a housing structure that is mounted for rotation about a main axis. A first spur gear is mounted on the housing structure with its center positioned at the main axis. Second and third spur gears are mounted on the housing structure for rotation about an axis that is parallel to the main axis. The second spur gear is meshed or in engagement with the first spur gear. A fourth spur gear is mounted on the housing structure for rotation about an axis that is parallel to the main axis and that is spaced a predetermined distance from the main axis, this predetermined distance being one fourth of the maximum desired stroke. The fourth spur gear is meshed or in engagement with the third spur gear. A crankpin is mounted on the fourth spur gear at the same predetermined distance from the axis of the fourth spur gear. The gears are of such size that the gear ratio between the first and fourth spur gears is two to one. When the housing structure is rotated, the crankpin on the fourth spur gear reciprocates along a straight line and has a stroke that is four times the predetermined distance. Since the spur gears may be positioned so that the predetermined distance is as small as desired, the stroke may be as small as desired. The stroke is along a straight line whose direction may be changed by rotating the first spur gear.

In another embodiment of my invention, the gear ratio between the first and fourth spur gears may be made more or less than two to one. With a ratio other than two to one, the crankpin reciprocates along a curved line that changes its general direction as the housing is rotated.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIG. 5 shows a further view, taken along the line 5—5 in FIG. 2, of portions of the drive of FIG. 2 for changing the direction of the crankpin stroke; and FIGS. 6 and 7 show diagrams illustrating certain features of my drive arrangement.

DESCRIPTION OF THE PREFERRED EMBODIMENTS

Figure 1:
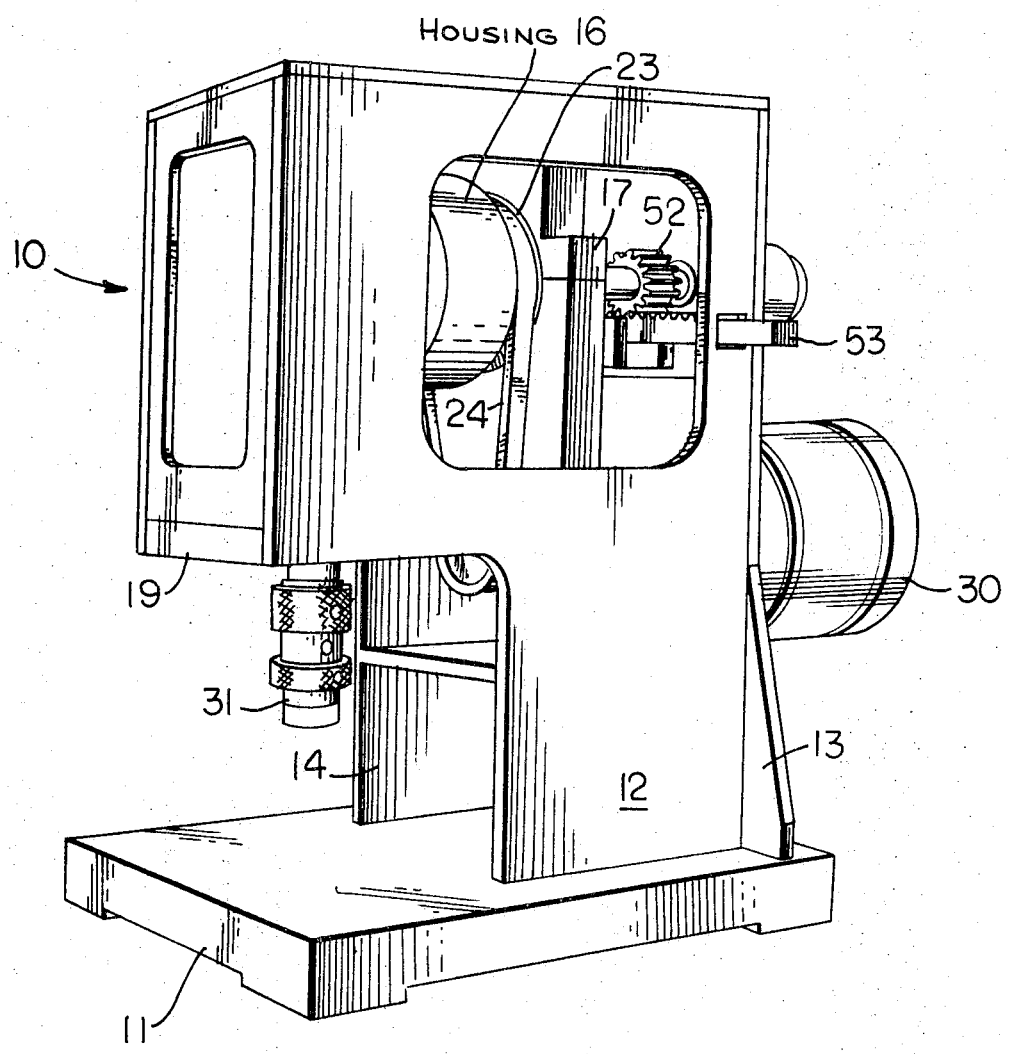
FIG. 1 shows a perspective view of a press utilizing my improved reciprocating drive.
Figure 2:
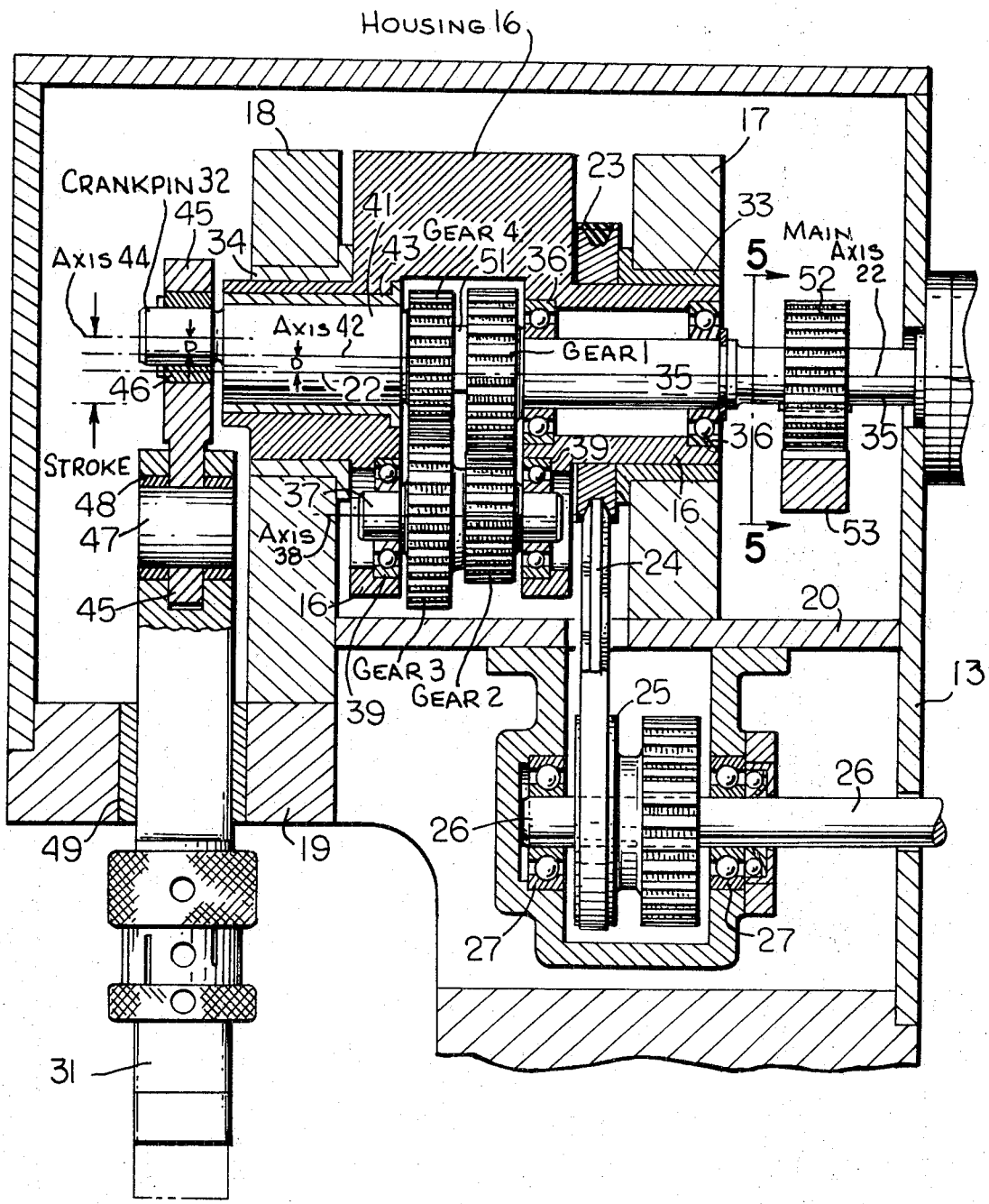
FIG. 2 shows a cross sectional view, taken along the line 2—2 in FIG. 3, showing the details of the drive used in the press of FIG. 1.

FIG. 1 shows a perspective view of a press 10 which may utilize my improved reciprocating drive arrangement. The press 10 is mounted on a suitable base 11, and has headers 12, 13, and 14 positioned on the base 11 to form a support for the press. A housing 16 is mounted for rotation on supports 17, 18 mounted on the headers 12, 13, 14. Both of the supports 17, 18 are visible in FIG. 2. As shown in FIG. 2, the support 18 is mounted on a horizontal member 19, and the support 17 is mounted on a horizontal member 20. The members 19, 20 are supported by the headers 12, 13, 14. The housing 16 is rotated about a main axis 22 by any suitable means, such as an attached pulley 23 which is driven by a belt 24. The belt 24 in turn is driven by a pulley 25 which is mounted on a shaft 26. The shaft 26 is mounted in suitable bearings 27 below the member 20, and is rotated by a suitable source of power 30. The source of power 30 may be an electric motor which drives a shaft having a flywheel if desired, and any suitable gearing between the source of power 30 and the shaft 26. An output member 31 extends downward from a crankpin 32. Any suitable tool (not shown) may be mounted on the member 31 to perform any desired operation. As will be explained, the member 31 and the crankpin 32 reciprocate along respective straight lines which may coincide.

Figure 3:
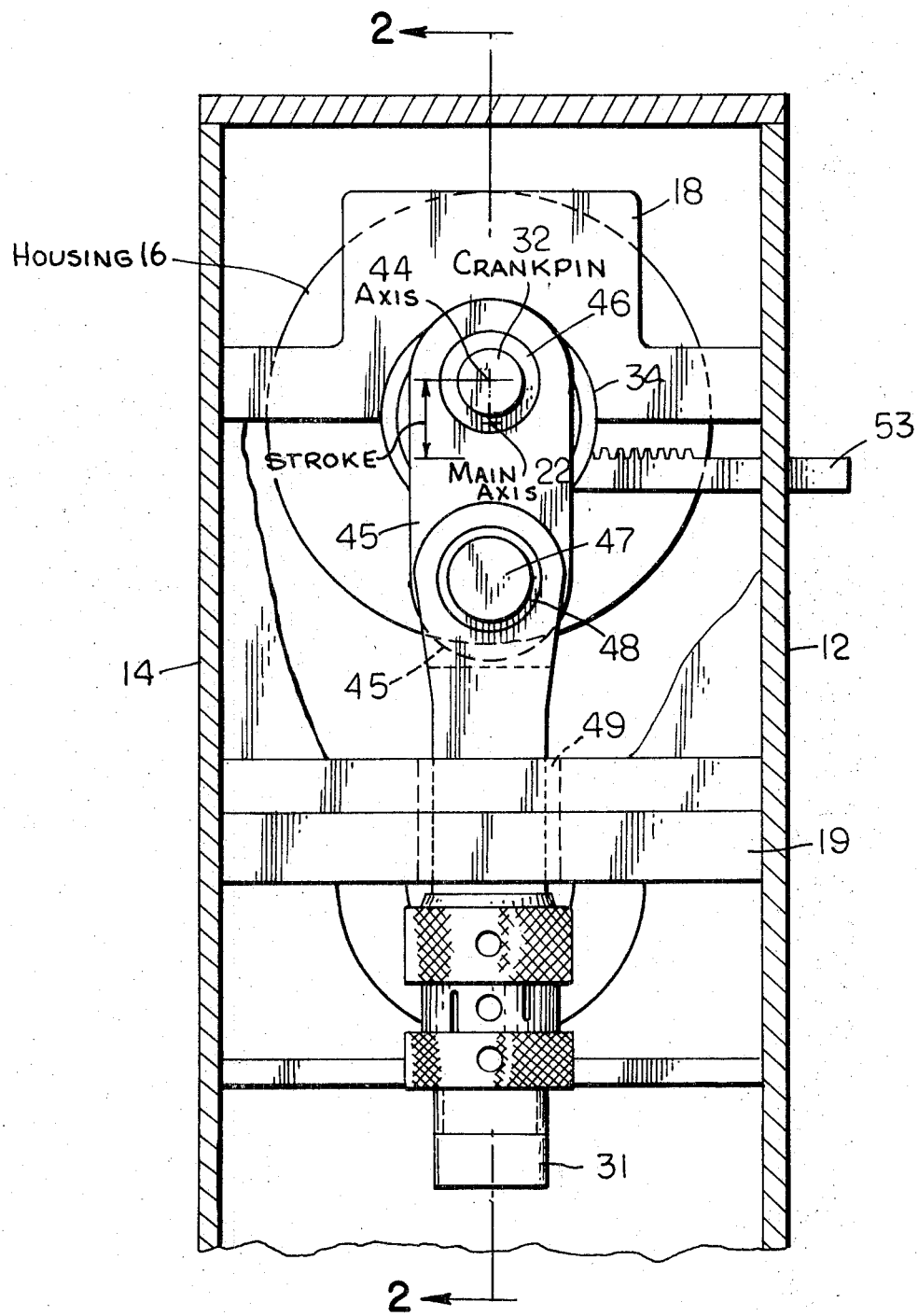
FIG. 3 shows an end view of the drive of FIG. 2.

With particular reference to FIGS. 2 and 3, the housing 16 is mounted for rotation about the main axis 22 in bearings 33, 34 mounted on the supports 17, 18 respectively. A spur gear 1 is fixedly mounted on a shaft 35 which is mounted for rotation in the housing 16 on suitable bearings 36. The center of gear 1 and of the shaft 35 coincide with the main axis 22. The shaft 35 is normally held in a fixed rotational position, but may be rotated to change the direction of the crankpin stroke line as will be explained. A spur gear 2 and a spur gear 3 are fixedly mounted on and rotate with a common shaft 37 having an axis 38. The axis 38 is parallel to the main axis 22. The shaft 37 is mounted on suitable bearings 39 on the housing 16. The external teeth of gear 2 are in engagement with or meshed with the external teeth of gear 1. A spur gear 4 is fixedly mounted on a shaft 41 whose center is positioned along an axis 42. The external teeth of gear 4 are in engagement with or meshed with the teeth of gear 3. The axis 42 is parallel to the main axis 22 and is spaced a predetermined radial distance D from the main axis 22. The shaft 41 is mounted in the housing 16 by a suitable bearing 43 so that the shaft 41 and the gear 4 can rotate about the axis 42 and also rotate concentrically about the main axis 22. The crankpin 32 is attached to the shaft 41 along an axis 44 which is parallel to the main axis 22, and which is spaced the predetermined radial distance D from the axis 42 of the gear 4.

A connecting rod 45 is mounted on the crankpin 32 by a suitable bearing 46. The connecting rod 45 extends downward and is attached to the output member 31 by a suitable pin 47 mounted in a bearing 48. The output member 31 extends downward through a bearing 49 in the member 19. A suitable thrust bearing 51 may be mounted on the gear 4 to take up thrust which may be exerted along the axis 42 of the gear 4, but which permits relatively free rotation of the gear 4 with respect to the gear 1.

In one prefered embodiment of my invention, the overall gear ratio from gear 1 through the gear train to gear 4 is two to one. That is, if the gear 1 were revolved, one revolution of the gear 1 would produce two revolutions of the gear 4. This overall gear ratio may be provided by an almost infinite number of combinations of gears. In FIG. 2, I contemplate that the ratio between the gear 1 and the gear 2 is four to three, and that the ratio between the gear 3 and the gear 4 is three to two. This produces an overall ratio of 4/3×3/2 or 2/1. Ideally from a space-saving standpoint, the ratio of gear 1 to gear 2 would be $\sqrt{2/1}$, and the ratio of the gear 3 to the gear 4 would also be $\sqrt{2/1}$, which would produce an overall ratio of 2/1. However, gears of such ratios are presently very difficult to design and build. Hence, more conventional gears which provide an overall gear ratio of two to one are preferred.

When the drive arrangement is in operation, the housing 16 is rotated about its main axis 22 by the belt 24. The gear 1 is stationary, and the gears 2 and 3 rotate about the axis 38 because the teeth of the gear 2 are in mesh with the teeth of the gear 1, and the axis 38 rotates about the main axis 22 because of the rotation of the housing 16. Rotation of the gear 3 causes the gear 4 to rotate about the gear 4 axis 42, and also causes the gear 4 axis 42 to move along the circumference of a circle having a radius D centered on the main axis 22. This rotation of the gear 4 and its shaft 41 about the axis 42 and also along the circumference of a circle having a radius D centered on the main axis 22 causes the crankpin 32 to move along a straight line in reciprocating fashion. The axis 44 of the crankpin 32 has a straight line reciprocating movement, and a stroke that is four times the predetermined distance D. In FIGS. 2 and 3, the rotational position of the gear 1 was set so that the direction of this straight line movement or motion is vertical. As will be explained subsequently, the direction of this straight line may be changed so that the net stroke of the output member 31 can be varied.

Figure 4:
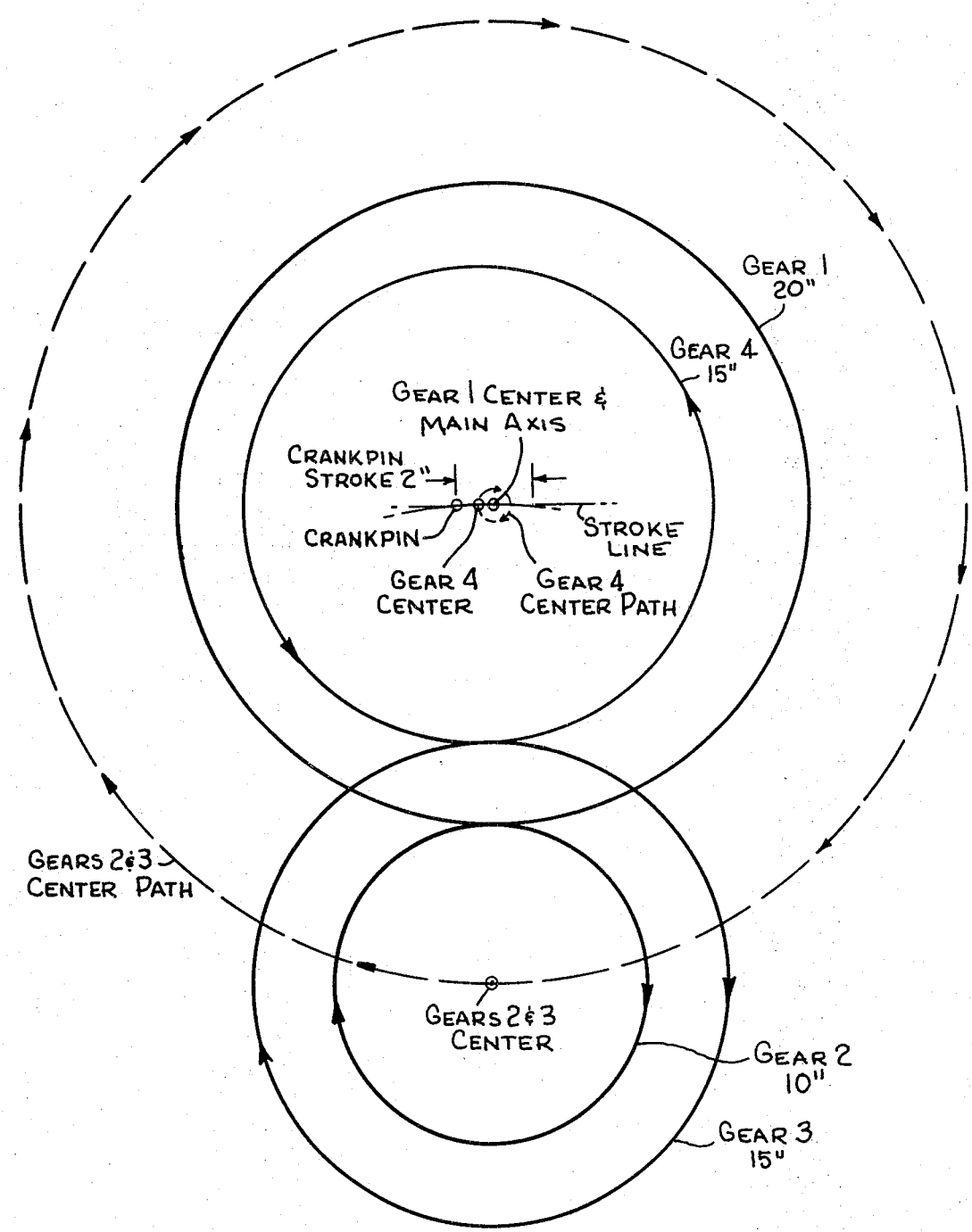
FIG. 4 shows a diagram illustrating the movement and design of one gear arrangement in accordance with my invention.

FIG. 4 shows a diagram which will assist in understanding how the arrangement and movement of the gears produces a stroke along a straight line. This diagram shows the ends of the axes or centers as seen from the left end of FIG. 2. In this diagram, it has been assumed that a stroke of two inches is needed, and that the force required for this stroke requires gears having a pitch diameter no smaller than ten inches. It has also been assumed that the gear 1 has a pitch diameter of twenty inches, the gear 2 has a pitch diameter of ten inches, and each of the gears 3 and 4 has a pitch diameter of fifteen inches. Thus, the ratio of gear 1 to gear 2 is two to one, and the ratio of gear 3 to gear 4 is one to one, so that the necessary overall gear ratio of two to one is provided. The pitch circles of these four gears are indicated by the solid line circles in FIG. 4. Since the pitch diameters of gear 1 plus gear 2 are equal to the pitch diameters of gear 3 plus gear 4 (namely thirty inches), the center of the gear 4 is spaced (along a circular arc that passes through the center of gear 1 and that has a center at the center of gears 2 and 3) from the center of the gear 1 by a distance of one fourth the stroke, or one half inch in the assumed example. The spaced gear 4 center is indicated in FIG. 4. Likewise, under the same requirements set out, the crankpin is positioned on the gear 4 at the same distance from the center of gear 4, namely one half inch. When the housing is rotated, the center of gears 2 and 3 move around the dashed line circular path indicated. It is assumed that this motion is in a clockwise direction. With the gear 1 stationary, the gear 2 rotates in a clockwise direction as indicated by the arrow on its pitch circle. Gear 3 rotates in the same clockwise direction as indicated by the arrow on its pitch circle because it is on the same shaft as the gear 2. Thus, the gears 2 and 3 rotate in a clockwise direction about their center, and their center moves along a circular path about the center of gear 1 and the main axis. The clockwise rotation of the gear 3 causes the gear 4 to rotate about its center in a counterclockwise direction, and causes the center of gear 4 to move clockwise along a circular path whose center is coincident with the gear 1 center and the main axis. As the gear 4 rotates in the counterclockwise direction about its center, and as the center of the gear 4 moves clockwise along a circular path, the crankpin is moved along the indicated crankpin stroke line. The crankpin is shown at one end of its stroke, and moves along the crankpin stroke line through the gear 1 center to a comparable point on the other side. The crankpin stroke is indicated, and in the example shown in FIG. 4 is two inches.

If, for some reason, it is desired not to have the sum of the pitch diameters of gear 1 and gear 2 equal the sum of the pitch diameters of gear 3 and gear 4, the pitch diameters of the gears 3 and 4 in the example of FIG. 4 may be changed so that they total 29.5 inches or 30.5 inches. In this case, if the gears 3 and 4 have equal pitch diameters, the respective pitch diameters would be 14.75 or 15.25 inches. The center of the gear 4 would be positioned on a straight line which, in the construction of FIG. 4, passes through the center of gears 2 and 3 and the center of gear 1. However, it is to be clearly understood that the various dimensions and gear sizes given by way of example only. Persons skilled in the art, particularly gear designers, will appreciate the large number of gear sizes and ratios which can be utilized in accordance with my invention. For this embodiment, the requirements are: that the overall ratio between gear 1 and gear 4 through gears 2 and 3 be two to one; that the center of gear 4 be spaced one fourth of the desired crankpin stroke from the center of gear 1; and that the crankpin center be spaced one fourth of the desired stroke from the center of gear 4. If these requirements are met, a straight line crankpin stroke is provided, and this stroke may be made as small as desired from gears, bearings, and other members strong enough to supply the desired forces.

For a given design, say a crankpin stroke of two inches, my invention permits the direction of the crankpin stroke to be changed about the main axis 22. Thus, with respect to FIG. 3, it may be desirable to change the direction of the crankpin stroke so that it is at some angle with respect to a vertical line. For example, if the direction of the crankpin stroke is at an angle of 45 degrees relative to a vertical line, the vertical movement or net stroke of the output member 31 would be reduced. If the direction of the crankpin stroke is at an angle of 90 degrees relative to a vertical line (i.e. horizontal), the vertical movement or net stroke of the output member 31 would be reduced to a minimum. This minimum would approach zero if the connecting rod 45 were relatively long and if the crankpin stroke were relatively short. The direction of the crankpin stroke can be changed by rotating the shaft 35 on which the gear 1 is mounted. This shaft rotation can be achieved in any suitable way, as for example by a pinion gear 52 keyed to the shaft 35 as shown in FIG. 5. If, as viewed in FIGS. 3, 4, and 5, the housing 16 rotates in a clockwise direction, the forces of the gear 1 are such as to cause the shaft 35 to also rotate in a clockwise direction. Hence, the pinion gear 52 also tends to rotate in a clockwise direction. In order that the pinion gear 52, the shaft 35, and the gear 1 can be held stationary, a rack 53 is positioned with its teeth in engagement with the teeth of the pinion gear 52. The rack 53 may be supported on the headers 12, 14 and held in fixed position or moved by any suitable device, such as another pinion gear (not shown). With respect to FIG. 5, the pinion gear 52 is arranged to be rotated through an angle of at least 90 degrees. When the pinion gear 52 is held in its midposition at the zero degree mark, the drive would be arranged so that the crankpin stroke followed a straight line positioned at 45 degrees with respect to a vertical line. If the gear 52 is rotated in a clockwise direction to the 45 degree mark indicated at the left of FIG. 5 and held in this position, then the crankpin stroke follows a straight line which is vertical. Similarly, if the gear 52 is rotated in a counterclockwise direction to the 45 degree mark indicated at the right of FIG. 5 and held in this position, then the crankpin stroke follows a straight line which is horizontal. There are, of course, any number of selectable positions between the two extremes indicated, so that the crankpin stroke can follow any desired straight line direction. It should be noted that the gear 52 may have its position easily and quickly changed, without the necessity of shutting down the drive, changing gears, or disengaging a clutch. All that is required to change the direction of the crankpin stroke of my drive arrangement is that the rack 53 be moved to position the gear 52 at the desired location, and then held at the desired position. The force required to hold the rack 53 is a measure of the torque on the gear 1, and the torque on the gear 1 is a measure of the press load. By proper calibration of an indicator to show the force required to hold the rack 53 with known press loads, then various unknown loads on the press can be indicated by an improved device. Such a device is particularly desirable in order that overloading of the press can be indicated.

If the gear 1 is not held in a fixed position and is rotated with the housing 16, the crankpin 32 will follow a circular path centered on the main axis 22. This circular path has a radius which may vary between zero (with the crankpin 32 rotating and centered on the main axis 22) and one half the crankpin stroke, depending upon the rotational position of the gear 1. The gear 1 may be released by permitting the pinion gear 52 (FIG. 5) to rotate. This rotation of the pinion gear 52 is provided by removing the rack 53. Such motion of the crankpin 32 may be desired in certain applications.

Figure 6:
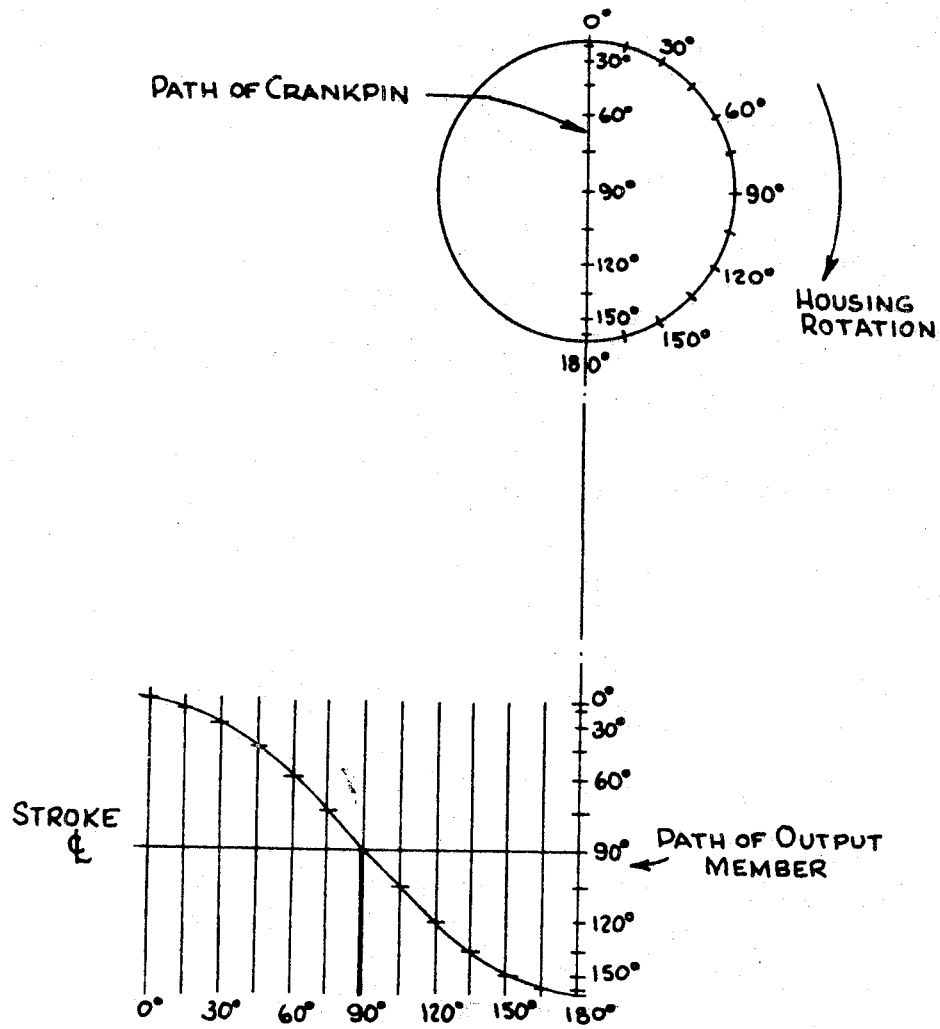

FIGS. 6 and 7 show diagrams that illustrate the operation and certain features of my drive arrangement. With reference to FIG. 6, I have shown the operating condition where the straight line direction of the crankpin is vertical. This upper portion of FIG. 6 shows the angular rotation of the housing and the corresponding crankpin path. As the housing rotates through the indicated angles, the crankpin is positioned along the vertical straight line having the corresponding angular indications. The output member is connected to the crankpin by a connecting rod as indicated in the previous figures. (The elements themselves are not shown in FIGS. 6 and 7 in order to keep the figures relatively simple.) The path of the output member is indicated in the lower part of FIG. 6, and it will be seen that it follows a vertical straight line with true sinusoidal motion. It will also be seen that the stroke center line, that is the center position between the upper and lower extremes of movement of the output member, occurs at the 90 degree position of the crankpin and housing rotation.

If the path length of the output member is to be reduced, the direction of the crankpin path is changed from the vertical direction shown in FIG. 6 toward a horizontal direction. FIG. 7 shows my drive arrangement with the crankpin path direction having an angle of 60 degrees with respect to a vertical line. The upper portion of FIG. 7 shows the angular rotation of the housing and the corresponding crankpin path. The lower portion of FIG. 7 shows the path of the output member. It will be seen that the total stroke of the output member of FIG. 7 is less than the total stroke shown in FIG. 6 As shown in the lower portion of FIG. 7, it will be seen that the stroke center line, that is the midpoint between the upper and lower extremes of the stroke, occurs before the housing has rotated 90 degrees. Actually, the stroke center line occurs after approximately 80 degrees of housing rotation. This leaves approximately 100 degrees of housing rotation in order to move the output member from the stroke center line to its lower position. Persons skilled in the art will appreciate the advantages of this feature, since the lower half of the distance that the output member travels occurs for 100 degrees of housing rotation. In other words, the lower half of the stroke distance of the output member requires more than half of the angular rotation of the housing, with the result that lower velocity and greater load capacity are produced during the lower portion of the stroke. This is particularly desirable in many applications, such as punch presses where a lower velocity but a higher force is required during the lower portion of the stroke.

If the direction of the crankpin path is directed to a horizontal line, then it will be seen that a minimum stroke length of the output member will be provided. Thus, if desired, the housing 16 may be constantly rotated but the gear 1 may be rotated as desired in order to provide a transition between a predetermined stroke length of the output member and a substantially zero stroke length of the output member. Thus, my drive arrangement permits the housing 16 to be constantly rotated, and does not require a clutch to start and stop the housing 16. With the housing 16 constantly rotated, the output member may be provided with any desired stroke by rotating the gear 1 to the desired angular position that provides the desired stroke. This rotation of the gear 1 may be manual, or may be automatic in accordance with some predetermined program. For example, the gear 1 may be positioned so that the direction of the crankpin path is horizontal and the output member stroke is a minimum. At some subsequent time, the gear 1 is rotated so that the direction of the crankpin path is at an angle of say 30 degrees with respect to a vertical line and the output member stroke is some intermediate length. At some subsequent time, the gear 1 is rotated again so that the crankpin path is vertical and the output member stroke is a maximum. As the crankpin path approaches the vertical, the net stroke of the output member increases, but as described in connection with FIG. 7), the stroke center line occurs before the 90 degree angle of housing rotation. At a subsequent time, the crankpin path may be made horizontal again. These and other changes may be made during a single stroke or cycle, or between one or more strokes or cycles. If the changes are made during a single stroke or cycle, the output member velocity can be controlled. Thus, my drive arrangement permits the net stroke of an output member to be increased and decreased in any desired manner by simply rotating the gear 1 without the use of a clutch or a similar engaging or disengaging mechanism.

While I have described my drive arrangement with an overall ratio of two to one between the gear 1 and the gear 4, persons skilled in the art will appreciate that this ratio may be changed to be greater than two to one or less than two to one. If the ratio is changed from two to one, then the crankpin path follows an arcuate line whose angular position changes. In other words, the arcuate path of the crankpin tends to walk or rotate around the main axis of the drive arrangement so that the direction of the crankpin path is constantly changing. The stroke length of the output member changes with this direction change. Such an arrangement may be desirable where an automatic or self-operating change of the crankpin path is desired in order to automatically or independently cause the net stroke of the output member to change. This type of drive arrangement might be desidable where repeated operations with an increasing or changing stroke is desired, such as in forging, swaging, or other operations, or such as in a conveyor or motion transmitting arrangement where varying lengths of motion are desired. If the ratio of the gear 1 to the gear 4 is changed from two to one, the displacement of the gear 4 center with respect to the gear 1 center should still be made in order to control the length of the crankpin path.

It will thus be seen that my drive arrangement provides improved operation for various types of devices such as feed mechanisms, conveyors, presses, or other power transmitting mechanisms. My drive arrangement permits the net stroke of an output member to be easily changed without the use of a clutch or similar device, and permits the crankpin to have any desired stroke length. The net stroke of the output member can be easily varied even while the drive arrangement is in operation so that no time consuming delay is required in order to change the net output stroke. Further, my drive arrangement is relatively simple, since it only requires four gears. Persons skilled in the art will appreciate that modifications may be made to my invention. For example, there is no limitation on the relative sizes and ratios of gears used as long as the desired gear ratio is maintained, as long as the predetermined distance is maintained between the center of the output gear 4 and the main axis, and as long as the predetermined distance is maintained between the crankpin center and the center of gear 4, where this predetermined distance is one fourth the distance desired crankpin stroke. Therefore, while my invention has been described with reference to particular embodiments, it is to be understood that modifications may be made without departing from the spirit of the invention or from the scope of the claims.

What I claim as new and desire to secure by Letters Patent of the United States is:

1. An improved drive for presses and the like comprising:
   (a) a first spur gear having its center positioned on a main axis;
   (b) means mounted for rotation about said main axis;
   (c) second and third spur gears mounted on said rotation means with their centers positioned on a common axis that is parallel to said main axis, with said second gear engaged with said first gear;
   (d) a fourth spur gear mounted on said rotation means with its center positioned a predetermined distance from said main axis and with said fourth gear engaged with said third gear;
   (e) a crankpin eccentrically mounted on said fourth gear and spaced said predetermined distance from said center of said fourth gear so that reciprocating straight line motion is obtained with the absence of said thrust, and
   (f) means operatively connected to said first spur gear for changing the velocity of the said reciprocating straight line motion.

2. The drive of claim 1 wherein said gears have a ratio of two to one between said first and fourth gears.

3. The drive of claim 2, and further comprising means connected to said first gear for rotating said first gear to a desired angular position.

4. The drive of claim 3 wherein said means for rotating said first gear can selectively hold said first gear against undesired rotation.

5. The drive of claim 2, and further comprising means connected to said rotation means for rotating said rotation means and thereby rotating said second, third, and fourth gears and moving said crankpin.

6. The drive of claim 2, and further comprising means connected to said first gear for rotating said first gear to a predetermined angular position, and means connected to said rotation means for rotating said rotation means and thereby rotating said second, third, and fourth gears moving said crankpin.

7. In a press, an improved reciprocating, straight line drive arrangement comprising:
(a) a housing structure mounted for rotation about a main axis;
(b) a first spur gear mounted on said housing structure with its center positioned at said main axis;
(c) a second spur gear mounted on said housing structure for rotation about an axis that is parallel to said main axis, said second gear being in engagement with said first gear;
(d) a third spur gear mounted on said housing structure for rotation about an axis that is parallel to said main axis, said third gear being connected to said second gear so that said third gear rotates in the same direction and at the same angular velocity as said second gear;
(e) a fourth spur gear mounted on said housing structure for rotation about an axis that is parallel to said main axis at a radial distance D therefrom, said fourth gear being in engagement with said third gear;
(f) said gears being of sizes such that the gear ratio between said first gear and said fourth gear is two to one;
(g) and reciprocating output means connected to said fourth gear and located said distance D from said axis of said fourth gear.

8. The drive arrangement of claim 7, and further comprising means connected to said first gear for rotating said first gear to a predetermined angular position.

9. The drive arrangement of claim 7, and further comprising means connected to said housing structure for rotating said housing structure and thereby rotating said second, third, and fourth gears and moving said reciprocating output means.

10. In a press, an improved reciprocating straight line drive arrangement comprising:
(a) a housing structure mounted for rotation about a first axis;
(b) a first gear-shaft mounted on said housing structure concentric with said first axis;
(c) a first spur gear mounted on said first gear-shaft;
(d) a second gear-shaft mounted on said housing structure for rotation about a second axis that is parallel to and spaced from said first axis;
(e) a second spur gear mounted on said second gear-shaft in mesh with said first gear;
(f) a third spur gear mounted on said second gear-shaft and spaced from said second gear;
(g) a third gear-shaft eccentrically mounted on said housing structure for rotation about a third axis that is parallel to and spaced a predetermined radial distance from said first axis;
(h) a fourth spur gear mounted on said third gear-shaft in mesh with said third gear;
(i) said gears having parameters such that the overall gear ratio of said meshed and connected gears is two to one between said first gear and said fourth gear;
(j) a crankpin eccentrically mounted on said fourth gear and spaced said predetermined radial distance from said third axis, and
(k) reciprocating output means mounted on said crankpin, and means connected to said first gear-shaft for changing the length of stroke of the reciprocating output means.

11. The improved drive arrangement of claim 10, and further comprising means connected to said first gear-shaft for rotating said first gear to a predetermined angular position, and means connected to said housing structure for rotating said housing structure and thereby moving said crankpin in a reciprocating, straight line motion.

12. The improved drive arrangement of claim 10, and further comprising means associated with said first gear-shaft for measuring the torque thereon to indicate the load on said press.

13. An arrangement in an improved drive for presses and the like for converting rotary motion into straight line reciprocating motion, comprising:
(a) a first gear having external teeth and a center positioned on a main axis;
(b) second and third gears having external teeth and a common axis of rotation, said second and third gears being spaced longitudinally along said common axis and arranged to rotate together;
(c) rotatable means for mounting said second and third gears along said common axis for rotation about said main axis with said teeth of said second gear engaged with said teeth of said first gear;
(d) a fourth gear having external teeth and a center;
(e) means eccentrically mounting said fourth gear with said center spaced a predetermined radial distance for rotation about said main axis with said teeth of said fourth gear engaged with said teeth of said third gear;
(f) a crankpin eccentrically mounted for rotation about said center of said fourth gear at said predetermined radial distance therefrom,
(g) reciprocating output means mounted on said crankpin, and
(h) means connected to said first gear for changing the length of stroke of the reciprocating and output means to change the velocity at the lower portion of the stroke.

14. The arrangement of claim 13, and further comprising means for driving said rotatable means.

15. The arrangement of claim 13, and further comprising means for fixing the angular position of said first gear.

References Cited

UNITED STATES PATENTS

| 634,194 | 10/1899 | Woodward | 74—52 |
| 2,628,024 | 2/1953 | Greenwood | 74—52 |
| 793,319 | 6/1905 | Paul | 74—50 |
| 1,313,490 | 8/1919 | Larson | 74—50 |
| 2,203,298 | 6/1940 | Granberg | 74—675 |
| 3,146,636 | 9/1964 | Wollenhaupt et al. | 74—675 |

FOREIGN PATENTS 795,296  5/1958  Great Britain.

WESLEY S. RATLIFF, Jr., Primary Examiner

U.S. Cl. X.R.

74—675

UNITED STATES PATENT OFFICE
CERTIFICATE OF CORRECTION

Patent No. 3,532,002　　　　　　　　　　Dated October 6, 1970

Inventor(s)　　Robert E. Arick

It is certified that error appears in the above-identified patent and that said Letters Patent are hereby corrected as shown below:

Column 1, line 34, "gear" should be -- gears --.

Column 7, line 52, the parentheses after FIG. 7, should be deleted.

Column 8, line 59, subparagraph (e), "said" should be -- side --.

Column 9, line 31, "and" should be deleted.

Column 9, line 33, the period should be deleted and a semicolon substituted therefor.

Column 9, subparagraph (h) and means for changing the length of stroke of the reciprocating output means. -- to be inserted after line 33.

Signed and sealed this 22nd day of December 1970.

(SEAL)
Attest:

EDWARD M. FLETCHER, JR.　　　　　　WILLIAM E. SCHUYLER, JR.
Attesting Officer　　　　　　　　　Commissioner of Patents